(12) United States Patent
Fukumoto

(10) Patent No.: US 12,709,249 B2
(45) Date of Patent: Aug. 18, 2026

(54) CLEANING CONTROL DEVICE, CLEANING CONTROL METHOD, AND CLEANING CONTROL PROGRAM

(71) Applicant: DENSO CORPORATION, Kariya-city (JP)

(72) Inventor: Harutsugu Fukumoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 217 days.

(21) Appl. No.: 18/179,972

(22) Filed: Mar. 7, 2023

(65) Prior Publication Data

US 2023/0219533 A1 Jul. 13, 2023

Related U.S. Application Data

(63) Continuation of application No. PCT/JP2021/030489, filed on Aug. 20, 2021.

(30) Foreign Application Priority Data

Sep. 11, 2020 (JP) ................................ 2020-153237

(51) Int. Cl.
*B60S 1/56* (2006.01)
*G06T 3/40* (2024.01)
(Continued)

(52) U.S. Cl.
CPC ................ *B60S 1/56* (2013.01); *G06T 3/40* (2013.01); *G06T 7/0002* (2013.01); *G06T 7/13* (2017.01);
(Continued)

(58) Field of Classification Search
CPC .......... B60S 1/56; G01S 17/89; G01S 17/931; G01S 2007/4975; G01S 2007/4977;
(Continued)

(56) References Cited

U.S. PATENT DOCUMENTS

2004/0257556 A1 12/2004 Samukawa et al.
2019/0385025 A1* 12/2019 McMichael ............ G01S 17/86
(Continued)

FOREIGN PATENT DOCUMENTS

| CN | 110293080 A | 10/2019 |
|---|---|---|
| JP | 2013-120076 A | 6/2016 |
| JP | 2017-138761 A | 8/2017 |

OTHER PUBLICATIONS

U.S. Appl. No. 18/179,958 and its entire file history, filed Mar. 7, 2023, Harutsugu Fukumoto.

*Primary Examiner* — Douglas Lee
(74) *Attorney, Agent, or Firm* — Precision Patents, P.C.

(57) ABSTRACT

A cleaning control device is configured to control a cleaning system of a vehicle equipped with (i) an optical sensor configured to acquire an outside light image according to intensity of outside light while light irradiation for sensing reflected light is stopped, (ii) a sensing camera configured to acquire a camera image according to the intensity of the outside light, and (iii) the cleaning system configured to clean an incident surface on which light is incident from sensing areas of the optical sensor and the sensing camera overlapping with each other. The cleaning control device includes an extraction unit configured to extract an unmatched pixel group by comparing the outside light image with the camera image, and a control unit configured to instruct the cleaning system to perform cleaning control to remove dirt from the incident surface, the dirt being estimated to correspond to the unmatched pixel group.

3 Claims, 16 Drawing Sheets

(51) Int. Cl.
*G06T 7/00* (2017.01)
*G06T 7/13* (2017.01)

(52) U.S. Cl.
CPC ...... *G06T 7/97* (2017.01); *G06T 2207/10028* (2013.01); *G06T 2207/30252* (2013.01)

(58) Field of Classification Search
CPC ............. G06T 1/00; G06T 2207/10028; G06T 2207/30168; G06T 2207/30252; G06T 3/40; G06T 7/0002; G06T 7/13; G06T 7/97; H04N 23/00; H04N 23/60
See application file for complete search history.

(56) References Cited

U.S. PATENT DOCUMENTS

2020/0142042 A1 5/2020 Hibino et al.
2020/0398797 A1 * 12/2020 Herman ............... H04N 23/811

* cited by examiner

CLEANING CONTROL DEVICE, CLEANING CONTROL METHOD, AND CLEANING CONTROL PROGRAM

CROSS REFERENCE TO RELATED APPLICATION

The present application is a continuation application of International Patent Application No. PCT/JP2021/030489 filed on Aug. 20, 2021, which designated the U.S. and claims the benefit of priority from Japanese Patent Application No. 2020-153237 filed on Sep. 11, 2020. The entire disclosures of all of the above applications are incorporated herein by reference.

TECHNICAL FIELD

The present disclosure relates to a control technique for a cleaning system of a sensor system of a vehicle.

BACKGROUND

In a sensor system of a vehicle, a sensing accuracy decreases when dirt adheres to an incident surface on which light is incident from a sensing area. Therefore, when dirt adheres to the incident surface, it is necessary to clean the incident surface. Especially in recent years, the cleaning of the incident surface in the automated driving mode of the vehicle has become important because it determines the continuity of automated driving.

SUMMARY

A first aspect of the present disclosure is a cleaning control device configured to control a cleaning system of a vehicle equipped with (i) an optical sensor configured to acquire an outside light image according to intensity of outside light while light irradiation for sensing reflected light is stopped, (ii) a sensing camera configured to acquire a camera image according to the intensity of the outside light, and (iii) the cleaning system configured to clean an incident surface on which light is incident from sensing areas of the optical sensor and the sensing camera overlapping with each other. The cleaning control device includes an extraction unit configured to extract an unmatched pixel group by comparing the outside light image with the camera image, and a control unit configured to instruct the cleaning system to perform cleaning control to remove dirt from the incident surface, the dirt being estimated to correspond to the unmatched pixel group.

A second aspect of the present disclosure is a cleaning control device configured to control a cleaning system of a vehicle equipped with (i) an optical sensor configured to acquire a reflected light intensity that is an intensity of reflected light of irradiated light, (ii) a sensing camera configured to acquire a camera image according to intensity of outside light in a sensing area that overlaps with a sensing area of the optical sensor, and (iii) the cleaning system configured to clean an incident surface of the optical sensor on which light from the sensing area is incident. The cleaning control device includes an extraction unit configured to extract a target object in the camera image, and a control unit configured to instruct the cleaning system to perform a cleaning control for the dirt estimated to correspond to a change amount of the reflected light intensity when the change amount of the reflected light intensity from the target object is out of an acceptable range.

A third aspect of the present disclosure is a cleaning control device configured to control a cleaning system of a vehicle equipped with (i) an optical sensor configured to acquire a reflected light intensity that is an intensity of reflected light of irradiated light, and acquire an outside light image according to intensity of outside light while light irradiation is stopped, and (ii) the cleaning system configured to clean an incident surface of the optical sensor on which light is incident from a sensing area. The cleaning control device includes an extraction unit configured to extract a target object in the outside light image, and a control unit configured to instruct the cleaning system to perform a cleaning control for the dirt estimated to correspond to a change amount of the reflected light intensity when the change amount of the reflected light intensity from the target object is out of an acceptable range.

A fourth aspect of the present disclosure is a cleaning control method for controlling a cleaning system of a vehicle equipped with (i) an optical sensor configured to acquire an outside light image according to intensity of outside light while light irradiation for sensing reflected light is stopped, (ii) a sensing camera configured to acquire a camera image according to the intensity of the outside light, and (iii) the cleaning system configured to clean an incident surface on which light is incident from sensing areas of the optical sensor and the sensing camera overlapping with each other. The cleaning control method includes extracting an unmatched pixel group by comparing the outside light image with the camera image, and instructing the cleaning system to perform cleaning control to remove dirt from the incident surface, the dirt being estimated to correspond to the unmatched pixel group.

A fifth aspect of the present disclosure is a cleaning control method for controlling a cleaning system of a vehicle equipped with (i) an optical sensor configured to acquire a reflected light intensity that is an intensity of reflected light of irradiated light, (ii) a sensing camera configured to acquire a camera image according to intensity of outside light in a sensing area that overlaps with a sensing area of the optical sensor, and (iii) the cleaning system configured to clean an incident surface of the optical sensor on which light from the sensing area is incident. The cleaning control method includes extracting a target object in the camera image, and instructing the cleaning system to perform a cleaning control for the dirt estimated to correspond to a change amount of the reflected light intensity when the change amount of the reflected light intensity from the target object is out of an acceptable range.

A sixth aspect of the present disclosure is a cleaning control method for controlling a cleaning system of a vehicle equipped with (i) an optical sensor configured to acquire a reflected light intensity that is an intensity of reflected light of irradiated light, and acquire an outside light image according to intensity of outside light while light irradiation is stopped, and (ii) the cleaning system configured to clean an incident surface of the optical sensor on which light is incident from a sensing area. The cleaning control method includes extracting a target object in the outside light image, and instructing the cleaning system to perform a cleaning control for the dirt estimated to correspond to a change amount of the reflected light intensity when the change amount of the reflected light intensity from the target object is out of an acceptable range.

A seventh aspect of the present disclosure is a computer program product configured to control a cleaning system of a vehicle equipped with (i) an optical sensor configured to acquire an outside light image according to intensity of outside light while light irradiation for sensing reflected light is stopped, (ii) a sensing camera configured to acquire a camera image according to the intensity of the outside light, and (iii) the cleaning system configured to clean an incident surface on which light is incident from sensing areas of the optical sensor and the sensing camera overlapping with each other. The computer program product is stored on at least one non-transitory computer readable medium and includes instructions configured to, when executed by at least one processor, cause the at least one processor to extract an unmatched pixel group by comparing the outside light image with the camera image, and instruct the cleaning system to perform cleaning control to remove dirt from the incident surface, the dirt being estimated to correspond to the unmatched pixel group.

An eighth aspect of the present disclosure is a computer program product configured to control a cleaning system of a vehicle equipped with (i) an optical sensor configured to acquire a reflected light intensity that is an intensity of reflected light of irradiated light, (ii) a sensing camera configured to acquire a camera image according to intensity of outside light in a sensing area that overlaps with a sensing area of the optical sensor, and (iii) the cleaning system configured to clean an incident surface of the optical sensor on which light from the sensing area is incident. The computer program product is stored on at least one non-transitory computer readable medium and includes instructions configured to, when executed by at least one processor, cause the at least one processor to extract a target object in the camera image, and instruct the cleaning system to perform a cleaning control for the dirt estimated to correspond to a change amount of the reflected light intensity when the change amount of the reflected light intensity from the target object is out of an acceptable range.

A ninth aspect of the present disclosure is a computer program product configured to control a cleaning system of a vehicle equipped with (i) an optical sensor configured to acquire a reflected light intensity that is an intensity of reflected light of irradiated light, and acquire an outside light image according to intensity of outside light while light irradiation is stopped, and (ii) the cleaning system configured to clean an incident surface of the optical sensor on which light is incident from a sensing area. The computer program product is stored on at least one non-transitory computer readable medium and includes instructions configured to, when executed by at least one processor, cause the at least one processor to extract a target object in the outside light image, and instruct the cleaning system to perform a cleaning control for the dirt estimated to correspond to a change amount of the reflected light intensity when the change amount of the reflected light intensity from the target object is out of an acceptable range.

EMBODIMENTS

Comparative Example

A technique of a comparative example is for determining dirt on the incident surface. In this comparative example, the dirt on the incident surface is determined based on changes in intensity of the reflected light of the light irradiation.

However, the technique of the comparative example has a concern that it may be difficult to accurately distinguish intensity of the reflected light from an object adjacent to the incident surface from intensity of the reflected light from dirt adhering to the incident surface. Accordingly, the cleaning control based on the determination of the comparative example may cause unnecessary cleaning.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 1:
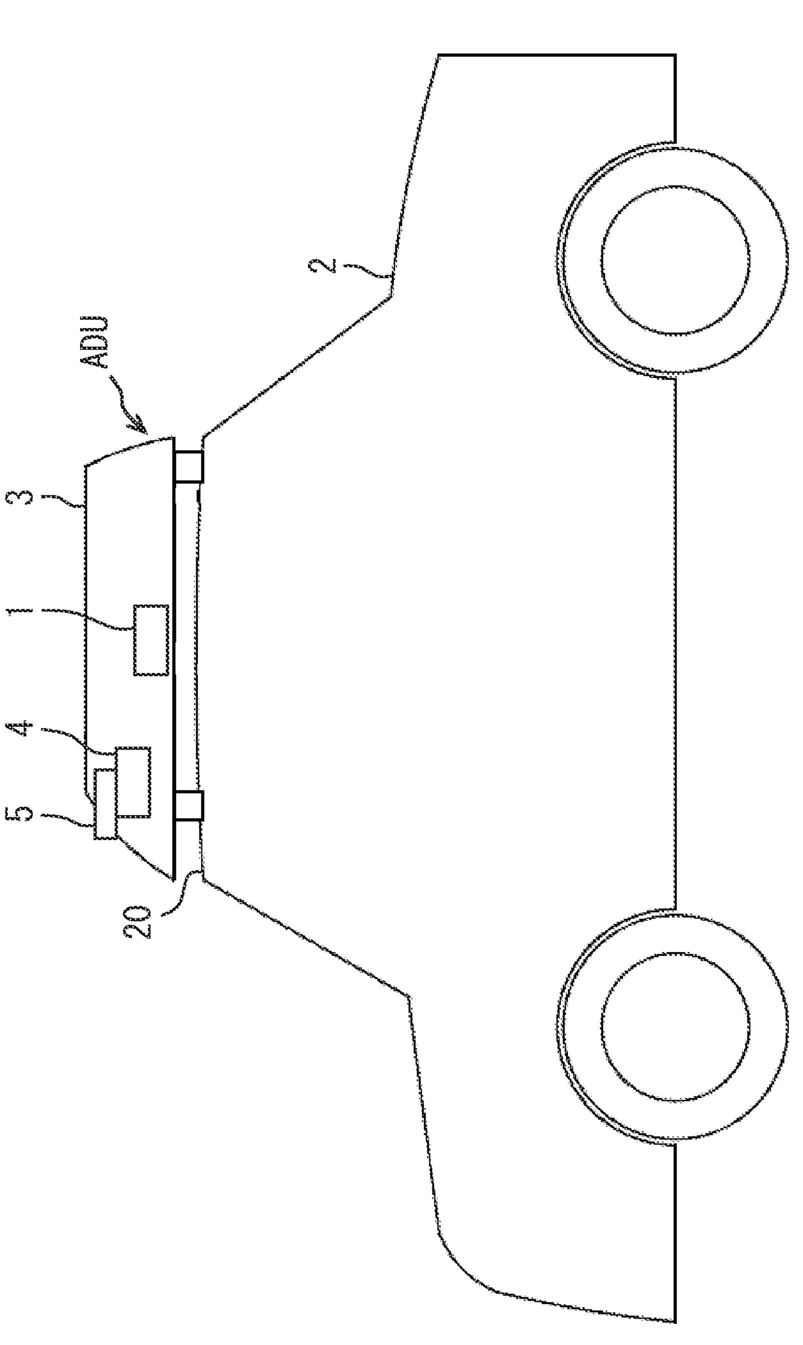
FIG. 1 is a side view of an automated driving unit mounted in a vehicle according to a first embodiment.
Figure 2:
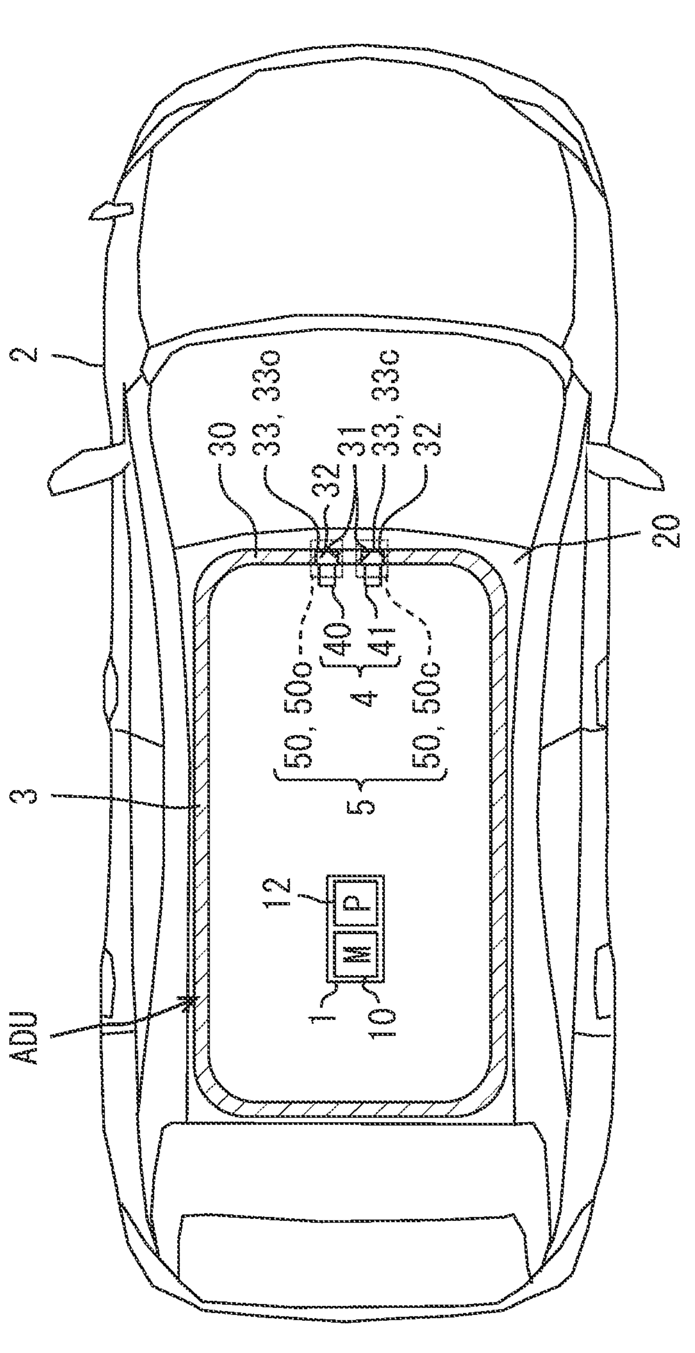
FIG. 2 is a cross-sectional diagram illustrating the automated driving unit according to the first embodiment.
Figure 3:
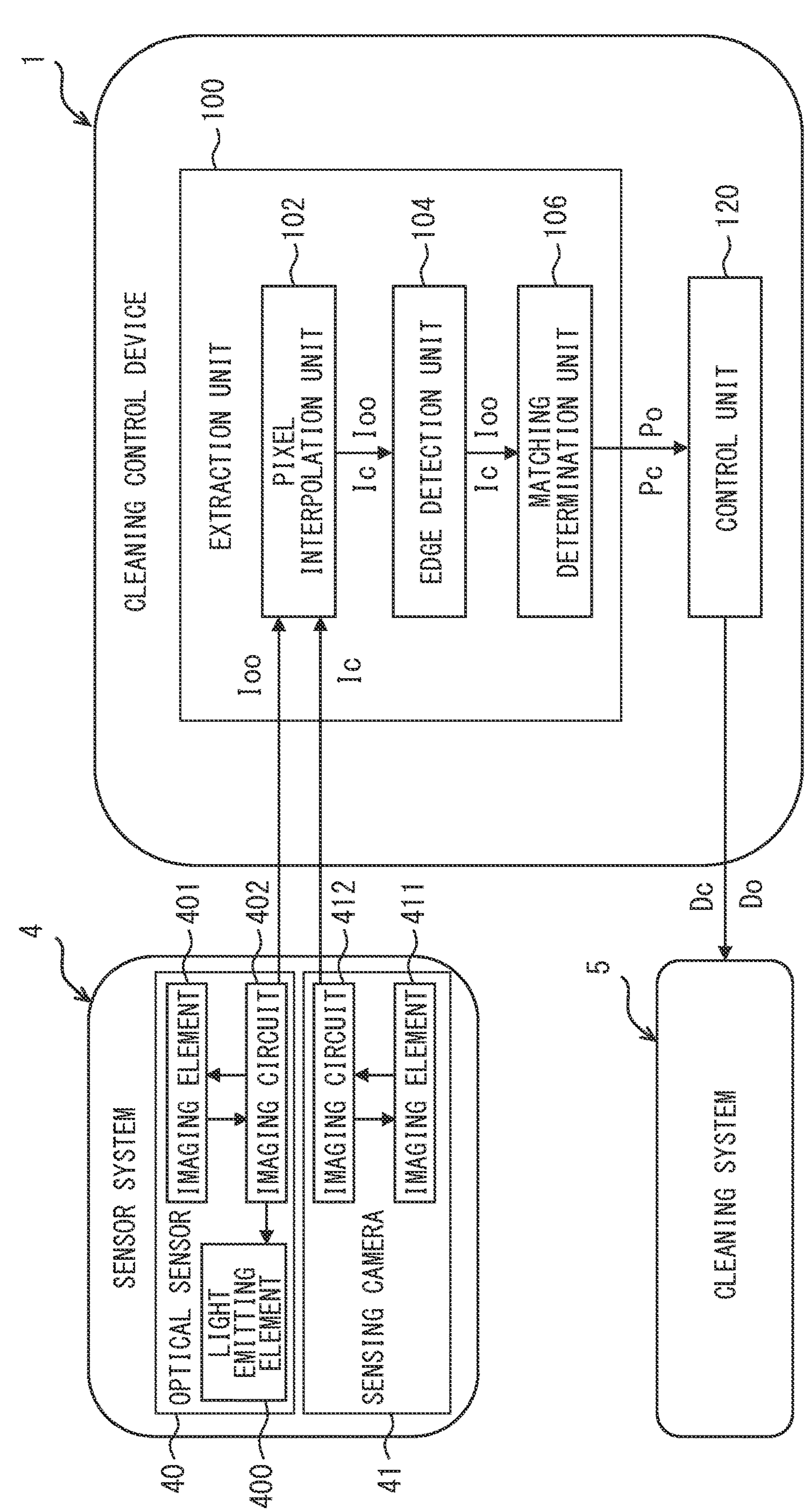
FIG. 3 is a block diagram showing a detail configuration of the cleaning control device according to the first embodiment.

As shown in FIG. 1, an automated driving unit ADU provided with a cleaning control device 1 of a first embodiment is mounted in a vehicle 2. The vehicle 2 is capable of steady or temporary automated driving in an automated driving mode under automated driving control or advanced driving support control. As shown in FIGS. 1 to 3, the automated driving unit ADU includes a cleaning control device 1, a housing 3, a sensor system 4, and a cleaning system 5. In the following description, front, rear, left, right, top and bottom are defined with respect to the vehicle 2 on the horizontal plane.

As shown in FIGS. 1, 2, the housing 3 is made of metal and has a hollow flat box shape, for example. The housing 3 is installed on a roof 20 of the vehicle 2. Multiple sensor windows 31 are open on a wall 30 of the housing 3. Each sensor window is covered by a translucent cover 32 having a plate shape. An outer surface of each translucent cover 32 is an incident surface 33 on which light from the outside of the vehicle 2 is incident.

Figure 4:
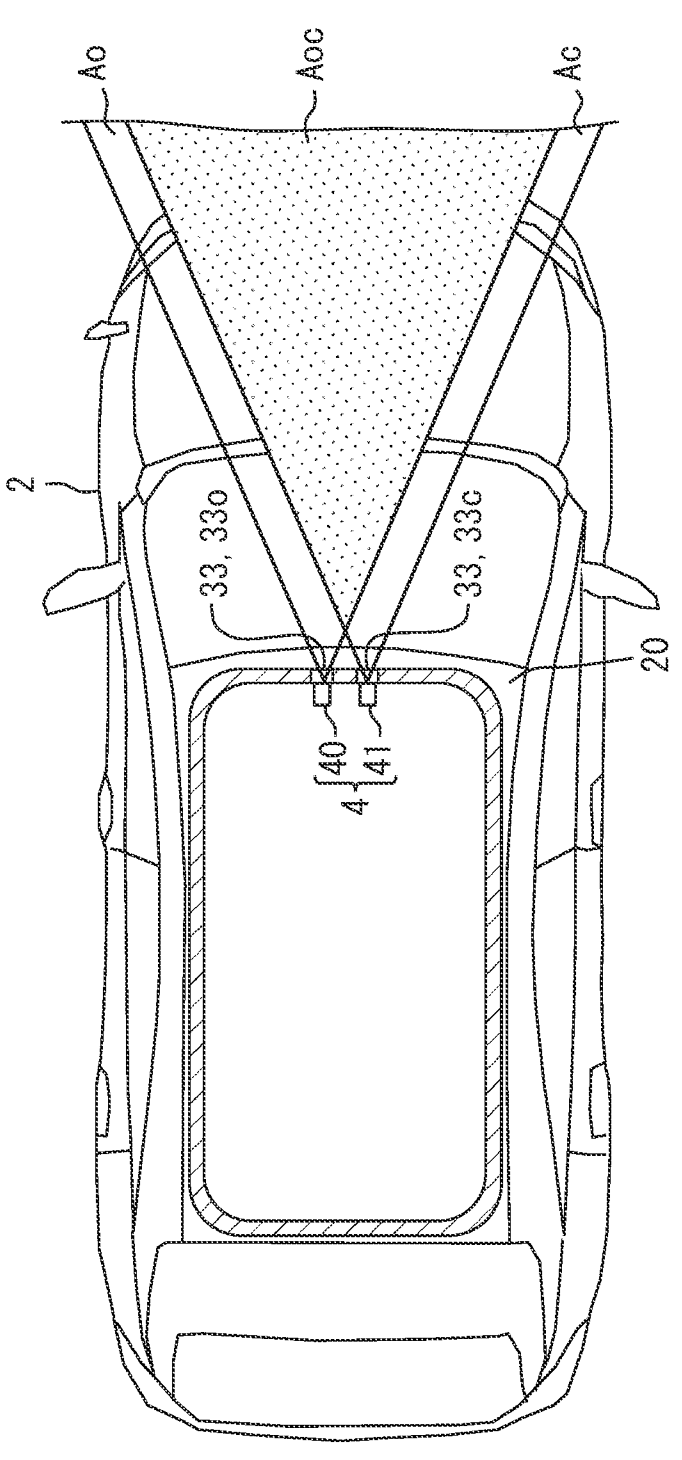
FIG. 4 is a cross-sectional diagram illustrating a sensing range of an optical sensor and a sensing camera according to the first embodiment.

As shown in FIGS. 2-4, the sensor system 4 includes an optical sensor 40. The optical sensor 40 of the first embodiment is a so-called LiDAR (Light Detection and Ranging/Laser Imaging Detection and Ranging) configured to acquire optical information that can be used in the automated driving mode of the vehicle 2. The optical sensor 40 includes an light emitting element 400, an imaging element 401, and an imaging circuit 402.

The light emitting element 400 is, for example, a semiconductor element such as a laser diode configured to emit directivity laser light. The light emitting element 400 is configured to intermittently irradiate laser light toward the outside of the vehicle 2 in the form of a pulse beam. The imaging element 401 is a semiconductor element such as SPAD (Single Photon Avalanche Diode) highly sensitive to light. An incident surface 33*o* for the optical sensor 40 is located on an outside (front side in the present embodiment) of the imaging element 401. The imaging element 401 is exposed to light incident on the incident surface 33*o* from a sensing area Ao defined by a view angle of the imaging element 401 in the outside. The imaging circuit 402 is an integrated circuit configured to control exposure and scan of pixels of the imaging element 401, and process signals from the imaging element 401 into data.

In a reflection light mode in which the imaging circuit 402 exposes the imaging element 401 to light emitted from the light emitting element 400, an object in the sensing area Ao is a reflection point of the laser light. As a result, the laser light reflected at the reflected point (hereinafter, referred to as reflected light) is incident on the imaging element 401 through the incident surface 33*o*. At this time, the imaging circuit 402 scans multiple pixels of the imaging element 401 to sense the reflected light.

In an outside light mode in which the imaging circuit 402 exposes the imaging element 401 while intermittent light irradiation from the light emitting element 400 is stopped, an object in the sensing area Ao is a reflection point of the outside light. As a result, the outside light reflected at the reflection point is incident on the imaging element 401 through the incident surface 330. At this time, the imaging circuit 402 scans multiple pixels of the imaging element 401 to sense the reflected outside light. The imaging circuit 402 converts luminance value acquired for each pixel based on intensity of the sensed outside light into two-dimensional data as pixel value to acquire an outside light image Ioo shown in FIG. 5.

As shown in FIGS. 2-4, the sensor system 4 includes a sensing camera 41 in addition to the optical sensor 40. The sensing camera 41 is an external camera configured to acquire optical information used for the automated driving mode of the vehicle 2. The sensing camera 41 includes an imaging element 441 and an imaging circuit 402.

The imaging element 411 is a semiconductor element such as CMOS. An incident surface 33*c* for the sensing camera 41 is located on an outside (front side in the present embodiment) of the imaging element 411. The imaging element 411 is exposed to light incident on the incident surface 33*c* from a sensing area Ac defined by a view angle of the imaging element 411 in the outside. As shown in FIG. 4, the sensing area Ac of the sensing camera 41 partially overlaps with the sensing area Ao of the optical sensor 40. The overlapping rate of the sensing areas Ac, Ao, that is, the ratio of the overlapping area Aoc in the sensing areas Ac, Ao is, for example, 50% or more, preferably 70% or more, and further preferably 90% or more. The imaging circuit 412 is an integrated circuit configured to control exposure and scan of pixels of the imaging element 411, and process signals from the imaging element 411 into data.

In an exposure mode in which the imaging circuit 412 exposes the imaging element 411 to light, an object in the sensing area Ac is a reflection point of outside light. As a result, the outside light reflected at the reflection point is incident on the imaging element 411 through the incident surface 33*c*. At this time, the imaging circuit 412 scans multiple pixels of the imaging element 411 to sense the reflected outside light. The imaging circuit 412 converts luminance value acquired for each pixel based on intensity of the sensed outside light into two-dimensional data as pixel value to acquire a camera image Io shown in FIG. 6.

The cleaning system 5 shown in FIGS. 1-3 is configured to clean the incident surfaces 33 including the incident surfaces 33*o*, 33*c* of the optical sensor 40 and the sensing camera 41 on which light is incident from the sensing areas Ao, Ac. The cleaning system 5 includes a cleaning module 50 for each incident surface 33. Each cleaning module 50 may include a cleaning nozzle configured to inject cleaning gas as a cleaning fluid for cleaning the incident surface 33. Each cleaning module 50 may include a cleaning nozzle configured to inject cleaning liquid as a cleaning fluid for cleaning the incident surface 33. Each cleaning module 50 may have a cleaning wiper configured to clean the incident surface 33 by wiping.

The cleaning control device 1 shown in FIGS. 2, 3 is connected with the electrical elements 4, 5 of the automated driving unit ADU through at least one of LAN (Local Area Network), a wire harness, an internal bus, and the like. The cleaning control device 1 includes at least one dedicated computer. The dedicated computer of the cleaning control device 1 may be an operation control ECU that controls the automated driving control mode in cooperation with an ECU (Electronic Control Unit) in the vehicle 2. The dedicated computer that constitutes the cleaning control device 1 may be an actuator ECU that individually controls the travel actuators of the vehicle 2. The dedicated computer of the cleaning control device 1 may be a locator ECU that estimates a state quantity of the vehicle 2 including its own position. The dedicated computer of the cleaning control device 1 may be a navigation ECU that navigates a travel route of the vehicle 2. The dedicated computer that constitutes the cleaning control device 1 may be an HCU (i.e., HMI (i.e., Human Machine Interface) Control Unit) that controls information presentation of the information presentation system of the vehicle 2.

The cleaning control device 1 including such dedicated computer has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes multiple instructions included in a cleaning control program stored in the memory 10. Accordingly, the cleaning control device 1 constructs a plurality of functional units (that is, functional blocks) for controlling the cleaning system 5. As described above, in the cleaning control device 1, the functional blocks are built by causing the processor 12 to execute multiple instructions of the cleaning control program stored in the memory 10 for controlling the cleaning system 5. As shown in FIG. 3, the plurality of functional units of the cleaning control device 1 include an extraction unit 100 a control unit 120.

In each control cycle, the extraction unit 100 receives the outside light image Ioo from the optical sensor 40 and the camera image Ic from the sensing camera 41. The extraction unit 100 is configured to extract unmatched pixel group by comparing the outside light image Ioo and the camera image Ic. The extraction unit 100 includes an pixel interpolation unit 102, an edge detection unit 104, and a matching determination unit 106 as sub-functional units.

Figure 7:
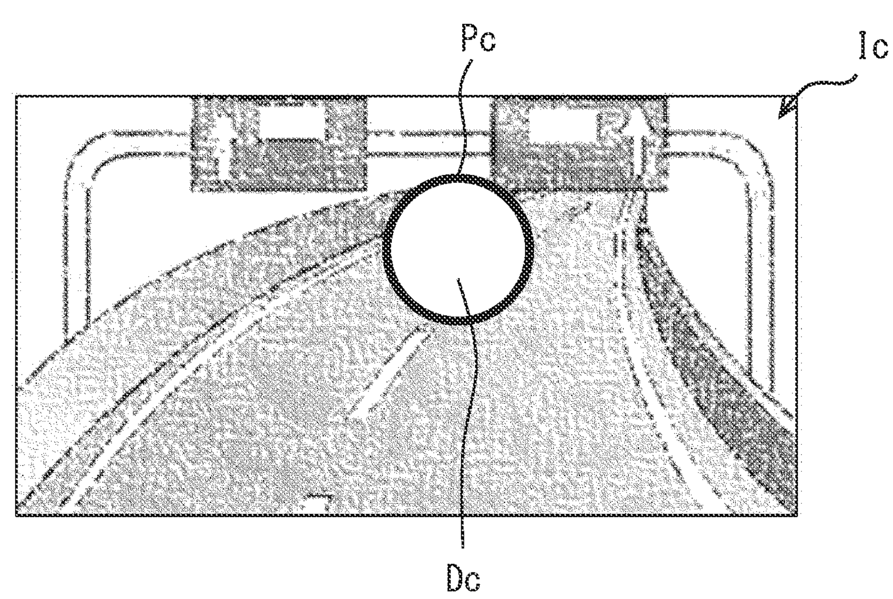
FIG. 7 is a diagram illustrating an interpolated image acquired by the sensing camera according to the first embodiment.

The pixel interpolation unit 102 is configured to interpolate the higher resolution one of the outside light image Ioo and the camera image Ic to the lower resolution one. In the present embodiment, the number of the pixels for capturing the overlapping area Aoc of the sensing areas Ao, Ac is larger in the camera image Ic than the outside light image Ioo. That is, the camera image Ic is the higher resolution one and the outside light image Ioo is the lower resolution one. Accordingly, the pixel interpolation unit 102 interpolates the pixel value of each pixel coordinate of the camera image Ic to each pixel coordinate of the outside light image Ioo. As a result of the interpolation, the pixel interpolation unit 102 generates, for the overlapping area Aoc, the camera image Ic having substantially the same resolution as the outside light image Ioo as shown in FIG. 7.

The edge detection unit 104 is configured to detect edges from the interpolated camera image Ic by performing at least one edge filter processing on the interpolated camera image Ic. The edge detection unit 104 is also configured to detect edges from the outside light image Ioo, which is the outside light image Ioo of the overlapping area Aoc having substantially the same resolution as the camera image Ic by the interpolation, by performing at least one edge filter processing.

Figure 5:
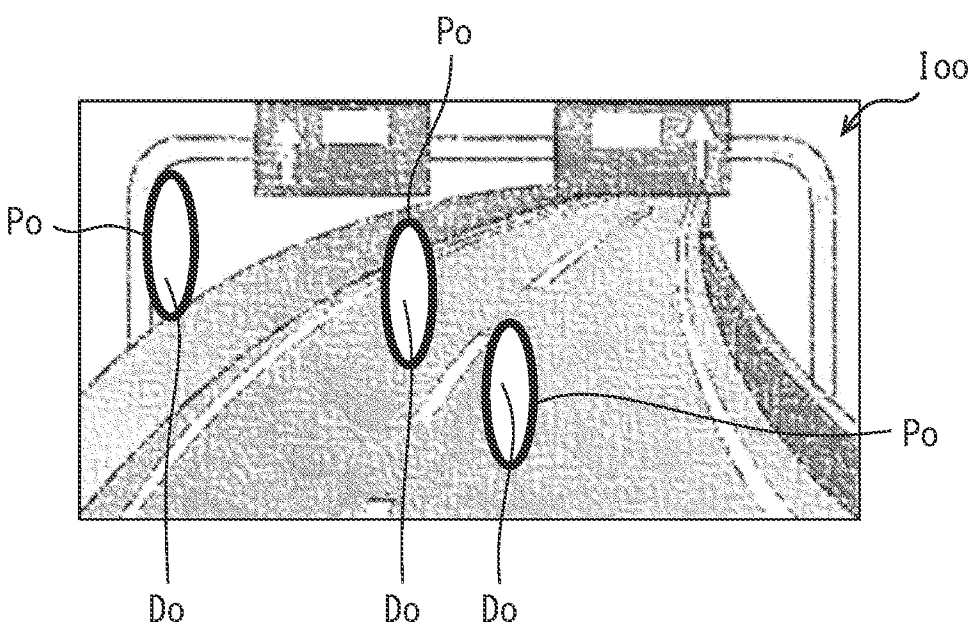
FIG. 5 is a diagram illustrating an image acquired by the optical sensor according to the first embodiment.

The matching determination unit 106 determines the matching status of the outside light image Ioo and the camera image Ic by comparing the edges from detected from these images. Specifically, the matching determination unit 106 normalizes the pixels of the edges and calculates differences, and determines that they are unmatched when a pixel having the difference exceeding a matching range is detected. As a result, the matching determination unit 106 extracts the pixel groups Po, Pc corresponding to the edges unmatched in the outside light image Ioo and the camera image Ic, as shown in FIGS. 5, 7. The pixel group means a group of multiple pixels, and the pixel groups Po, Pc determined to be unmatched may be multiple adjacent pixels. For convenience of explanation, in FIGS. 5, 7, the unmatched pixel groups Po, Pc are indicated by attaching symbols Po, Pc to a thick solid line circle.

Figure 6:
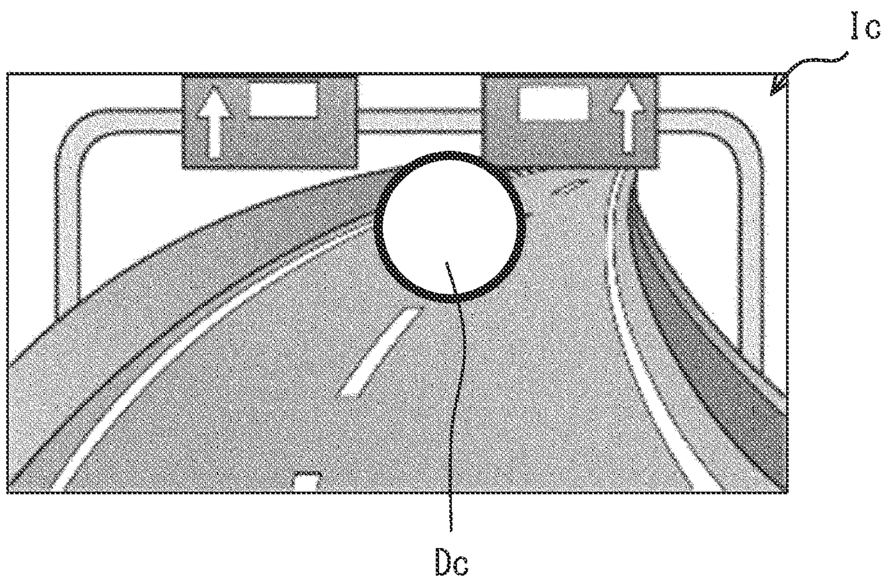
FIG. 6 is a diagram illustrating an image acquired by the sensing camera according to the first embodiment.

As shown in FIG. 3, the control unit 120 receives the pixel groups Po, Pc of the images Ioo, Ic extracted by the unmatched determination by the matching determination unit 106. The control unit 120 is configured to estimate that such unmatched pixel groups Po, Pc correspond to dirt Do, Dc attached to the incident surface 33*o*, 33*c* of the optical sensor 40 or the sensing camera 41 as shown in FIGS. 5-7. The control unit 120 is configured to instruct the cleaning control to the cleaning system 5 of the vehicle 2 in the automated driving mode to remove the dirt Do, Dc estimated to correspond to the unmatched pixel groups Po, Pc. In response to the instruction, the cleaning system 5 performs a cleaning processing for the incident surfaces 330, 33*c* by actuating the cleaning modules 500, 50*c* corresponding to the incident surfaces 33*o*, 33*c* as shown in FIG. 2.

Figure 8:
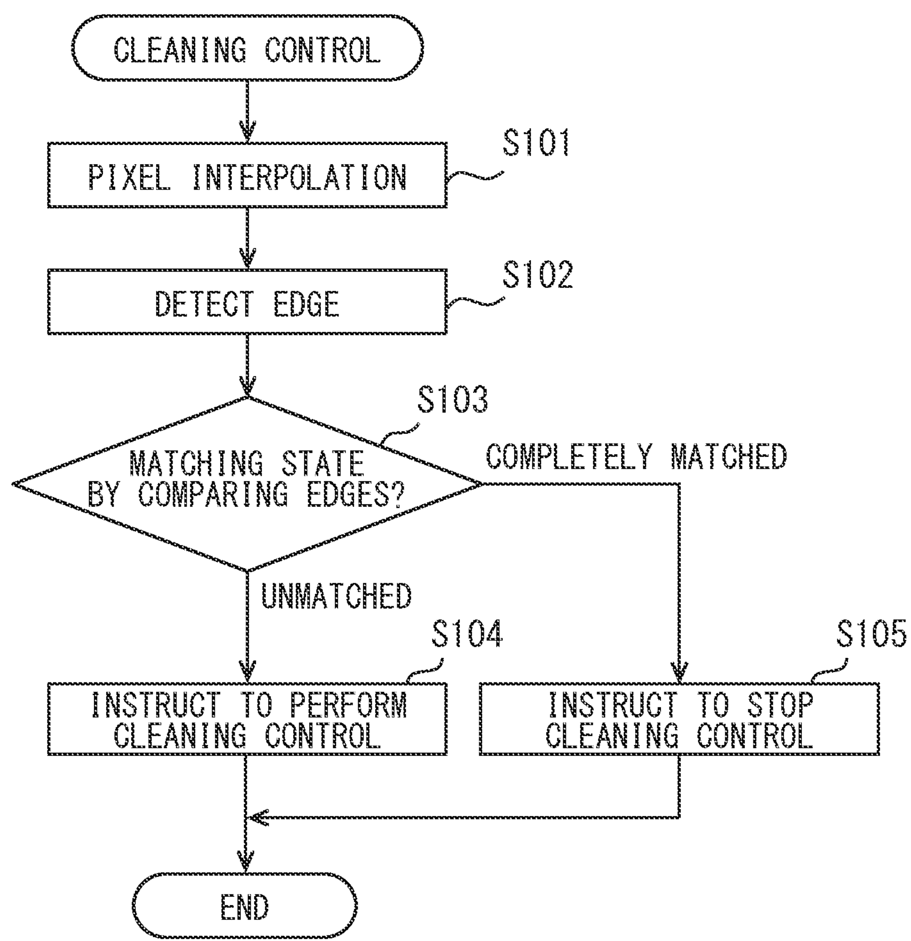
FIG. 8 is a flow chart showing a cleaning control method according to the first embodiment.

The flow of the cleaning control method for controlling the cleaning system 5 by the cleaning control device 1 using the functional units 100, 120 will be described below with reference to FIG. 8. Further, in this flow, "S" means steps of the process executed by instructions included in the cleaning control program.

In S101, the pixel interpolation unit 102 of the extraction unit 100 interpolates the high resolution camera image Ic in accordance with the low resolution outside light image Ioo. Subsequently, in S102, the edge detection unit 104 of the extraction unit 100 detects the edges from the outside light image Ioo and the camera image Ic. In S103, the matching determination unit 106 of the extraction unit 100 determines the matching status of the outside light image Ioo and the camera image Ic by comparing the edges from detected from these images.

When the unmatched pixel groups Po, Pc different between the outside light image Ioo and the camera image Ic are extracted in S103, the flow proceeds to S104. In S104, the control unit 120 instructs the cleaning control to the cleaning system 5 of the vehicle 2 in the automated driving mode to remove the dirt Do, Dc estimated to correspond to the unmatched pixel groups Po, Pc.

In contrast, when the unmatched pixel groups Po, Pc different between the outside light image Ioo and the camera image Ic are not extracted in S103, the flow proceeds to S105. In S105, the control unit 120 instructs the cleaning system 5 to stop the cleaning control. Accordingly, S101, S102, S103 correspond to an extraction process, and S104, S105 correspond to a control process.

Operation Effect

The operation and effects of the first embodiment described above will be described below.

According to the first embodiment, the outside light image Ioo acquired by the optical sensor 40 based on the outside light intensity while the light irradiation for sensing the reflected light is stopped is compared with the camera image acquired by the sensing camera 41 based on the outside light intensity, the sensing areas Ao, Ac of the optical sensor 40 and the sensing camera 41 overlapping with each other. The unmatched pixel groups Po, Pc extracted by such comparison can be accurately estimated to correspond to dirt Do, Dc adhering to the incident surface 33*o* of the optical sensor 40 or the incident surface 33*c* of the sensing camera 41. Accordingly, by instructing the control to the cleaning system 5 to remove the dirt as a result of the estimation, the cleaning control can be more accurate. It may be particularly effective as the cleaning control which affects the continuity of the automated driving mode of the vehicle 2.

According to the comparison of the edges of the outside light image Ioo and the camera image Ic of the first embodiment, the unmatched pixel groups Po, Pc can be accurately extracted from the edges. Accordingly, the cleaning control for the dirt Do, Dc estimated to correspond to the unmatched pixel groups Po, Pc can be adequately instructed.

According to the first embodiment, the higher resolution one of the outside light image Ioo and the camera image Ic is interpolated to the lower resolution one, and then the images Ioo, Ic are compared with each other. According to such comparison, it is possible to prevent a situation in which a pixel group that should be matched is erroneously extracted due to a difference in resolution. Accordingly, the cleaning control for the dirt Do, Dc estimated to correspond to the unmatched pixel groups Po, Pc can be adequately instructed.

Second Embodiment

Figure 9:
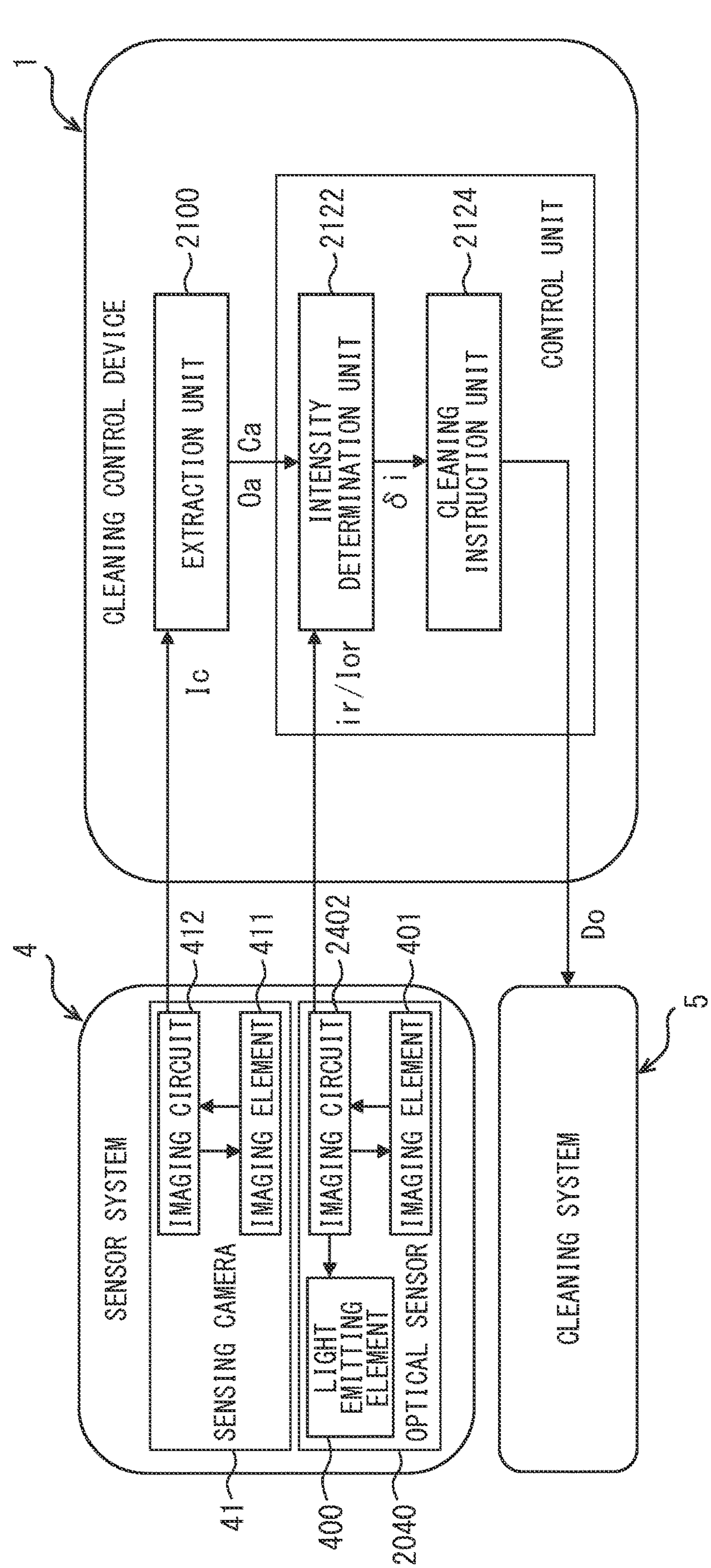
FIG. 9 is a block diagram showing a detail configuration of the cleaning control device according to a second embodiment.

As shown in FIG. 9, a second embodiment is a modification of the first embodiment.

Figure 10:
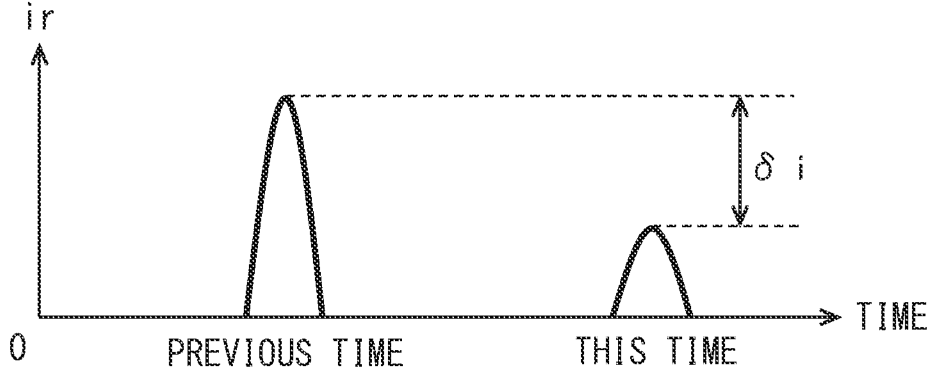
FIG. 10 is a diagram illustrating an intensity acquired by the optical sensor according to the second embodiment.

In the optical sensor 2040 of the second embodiment, the imaging circuit 2402 in a reflected light mode is configured to acquire the intensity of the reflected light of the light irradiation as a reflected light intensity ir shown in FIG. 10. The imaging circuit 2402 may output the reflected light intensity of the specified pixel, which is specified as described below. Alternatively, the imaging circuit 2402 may acquire the reflected light image Ior shown in FIG. 11 by converting the luminance value acquired according to the reflected light intensity ir of some pixels into a two-dimensional data as a pixel value. The function of acquiring the outside light image Ioo by the optical sensor 2040 of the second embodiment is not essential, and is omitted in FIG. 9.

Figure 12:
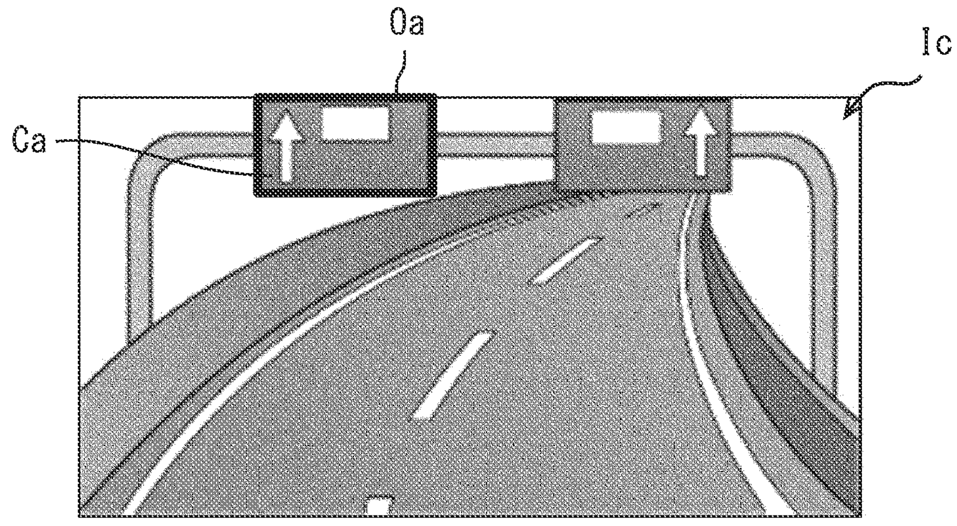
FIG. 12 is a diagram illustrating an image acquired by the sensing camera according to the second embodiment.

The extraction unit 2100 according to the second embodiment receives the camera image Ic from the sensing camera 41 in each control cycle. As shown in FIG. 12, the extraction unit 2100 extracts one target object Oa which is an object of interest in the camera image Ic. The extraction of the target object Oa is performed by a image filter or a pattern recognition using a machine learning model. As a result, one target object Oa having a clear feature value or multiple target objects Oa scattered in the camera image Ic may be extracted. The extraction unit 2100 is configured to generate pixel coordinate information Ca of pixels in the camera image Ic corresponding to the extracted target objects Oa.

As shown in FIG. 9, the control unit 2120 receives the pixel coordinate information Ca of the target object Oa extracted by the extraction unit 2100. The control unit 2120 includes an intensity determination unit 2122 and a cleaning instruction unit 2124 as sub-functional units.

The intensity determination unit 2122 is configured to a change amount δi of the reflected light intensity ir from the target object Oa as shown in FIG. 10. The intensity determination unit 2122 may be configured to acquire the reflected light intensity ir at a selected pixel as the reflected light intensity ir from the target object Oa by selecting each control cycle a pixel corresponding the pixel coordinate information Ca of the target object Oa. Alternatively, the intensity determination unit 2122 may be configured to acquire, as the reflected light intensity ir, the reflected light intensity ir represented as the luminance value of the pixel corresponding to the pixel coordinate information Ca of the target object Oa in the reflected light image Ior input from the optical sensor 2040.

Figure 11:
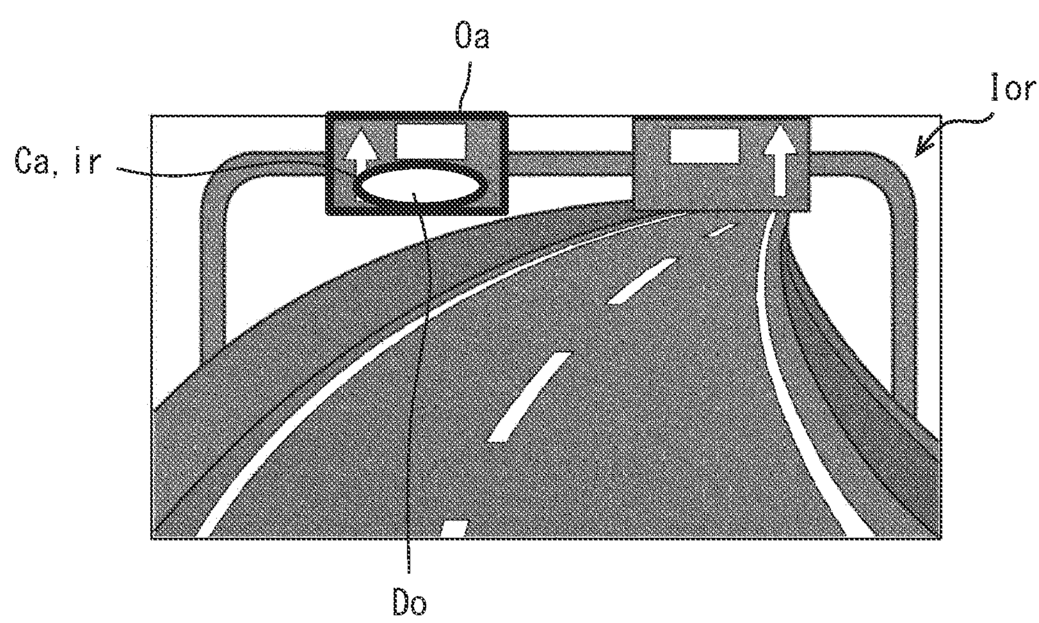
FIG. 11 is a diagram illustrating an image acquired by the optical sensor according to the second embodiment.

The intensity determination unit 2122 is configured to determine the change amount δi in the reflected light intensity ir acquired in this control cycle from the previous control cycle as shown in FIG. 10 by comparing the predetermined acceptable range. The acceptable range is defined as a range under a threshold value related to the change amount δi of the reflected light intensity ir or a range equal to or smaller than the threshold value. When the change amount δi of the reflected light intensity ir from the target object Oa is out of the acceptable range, the intensity determination unit 2122 estimates the change amount δi corresponds to dirt Do adhering to the incident surface 330 of the optical sensor 2040 as shown in FIG. 11. This estimation is based on the fact that the reflected light intensity ir of the same target object Oa is constant during sensing due to the inherent reflectance.

In the intensity determination unit 2122 the pixel whose reflected light intensity ir is acquired and the change amount δi is determined in the reflected light image Io corresponds to the pixel coordinate information Ca of the target object Oa given by the extraction unit 2100 as shown in FIG. 11. For the same target object Oa, the change amount δi of a single pixel may be determined (checked), or an average change amount δi or a total change amount δi of the reflected light intensities of a pixel group containing pixels may be determined.

When the change amount δi of the reflected light intensity ir from the target object Oa is out of the acceptable range, the cleaning instruction unit 2124 instructs to the cleaning system 5 of the vehicle 2 in the automated driving mode to remove the dirt Do estimated to correspond to the change amount δi out of the acceptable range. In response to the instruction, the cleaning system 5 performs a cleaning processing for the incident surface **33*o* of the optical sensor 2040 by actuating the cleaning module 50*o* corresponding to the incident surface 33*o*. At this time, the cleaning instruction for the incident surface 33*c* of the sensing camera 41 is not necessary, and the cleaning module 50*c* is not essential. However, when it is estimated that the dirt adheres to the incident surface 33*o* of the optical sensor 2040, the cleaning control may be performed as the dirt also adheres to the incident surface 33*c* of the sensing camera 41 adjacent to the optical sensor 40**.

Figure 13:
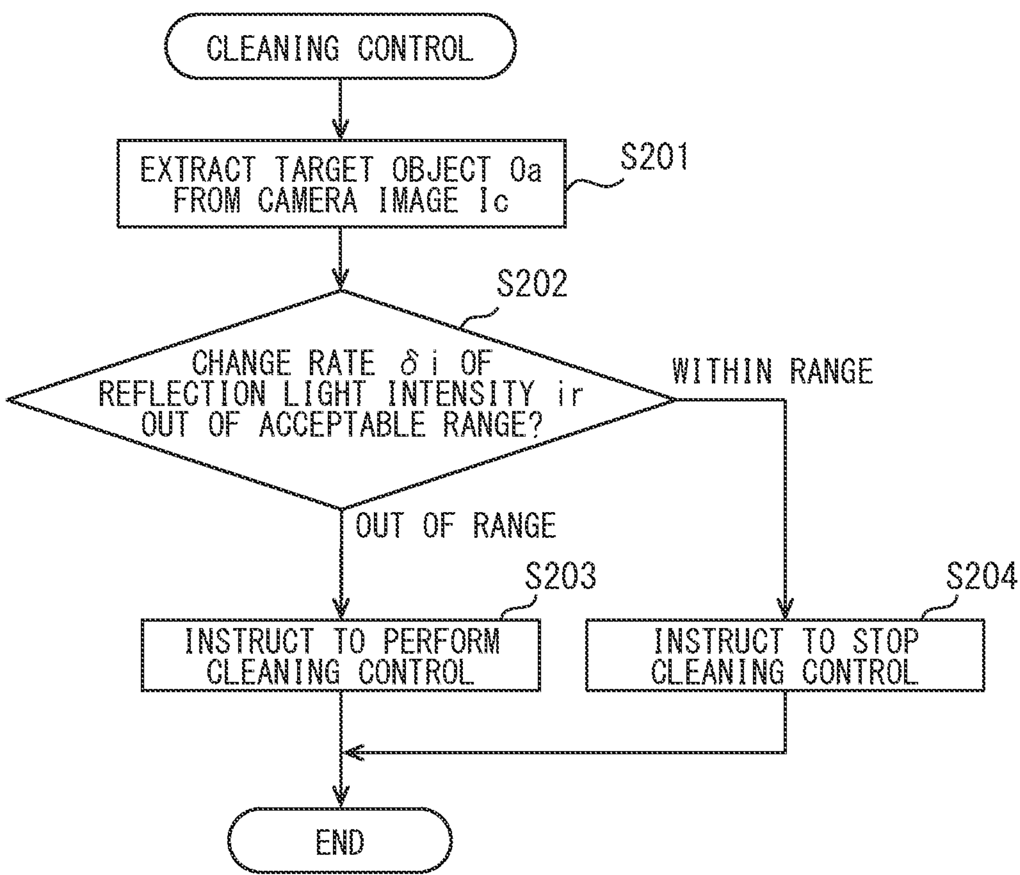
FIG. 13 is a flow chart showing a cleaning control method according to the second embodiment.

In a flow of the cleaning control method according to the second embodiment, the extraction unit 2100 extracts in S201 the target object Oa from the camera image Ic as shown in FIG. 13. Subsequently, in S202, the intensity determination unit 2122 of the control unit 2120 determines that whether the change amount δi of the reflected light intensity ir from the target object Oa is out of the acceptable range.

When the change amount δi of the reflected light intensity ir from the target object Oa is out of the acceptable range in S202, the flow proceeds to S203. In S203, the cleaning instruction unit 2124 of the control unit 2120 instructs the cleaning system 5 of the vehicle 2 in the automated driving mode to perform the cleaning control to remove the dirt Do which is estimated to correspond to the change amount δi out of the acceptable range.

When the change amount δi is within the acceptable range in S202, the flow proceeds to S204. In S204, the cleaning instruction unit 2124 of the control unit 2120 instructs the cleaning system 5 to stop the cleaning control. Accordingly, S201 corresponds to an extraction process, and S202, S203, S204 correspond to a control process.

Operation Effect

The operation and effect of the second embodiment described above will be described below.

According to the second embodiment, the target object Oa is extracted from the camera image Ic acquired by the sensing camera 41 based on the outside light intensity in the sensing area Ac overlapping with the optical sensor 2040. The change amount δi of the reflected light intensity ir from the target object Oa acquired by irradiation of light from the optical sensor 2040 is adequately estimated to correspond to the dirt Do (see FIG. 11) adhering to the incident surface 330 of the optical sensor 2040 when the change amount δi is out of the acceptable range. Accordingly, by instructing the control to the cleaning system 5 to remove the dirt Do as a result of the estimation, the cleaning control can be more accurate.

In the reflected light image Ior acquired by the optical sensor 2040 as in the second embodiment, it is easy to accurately specify the pixel corresponding to the target object Oa extracted from the camera image Ic acquired by the sensing camera 41. According to this, the cleaning for the dirt Do which is estimated to correspond to the change amount δi out of the acceptable range can be adequately instructed when the change amount δi of the reflected light intensity ir at the pixel corresponding to the target object Oa in the reflected light image Ior is out of the acceptable range.

Third Embodiment

Figure 14:
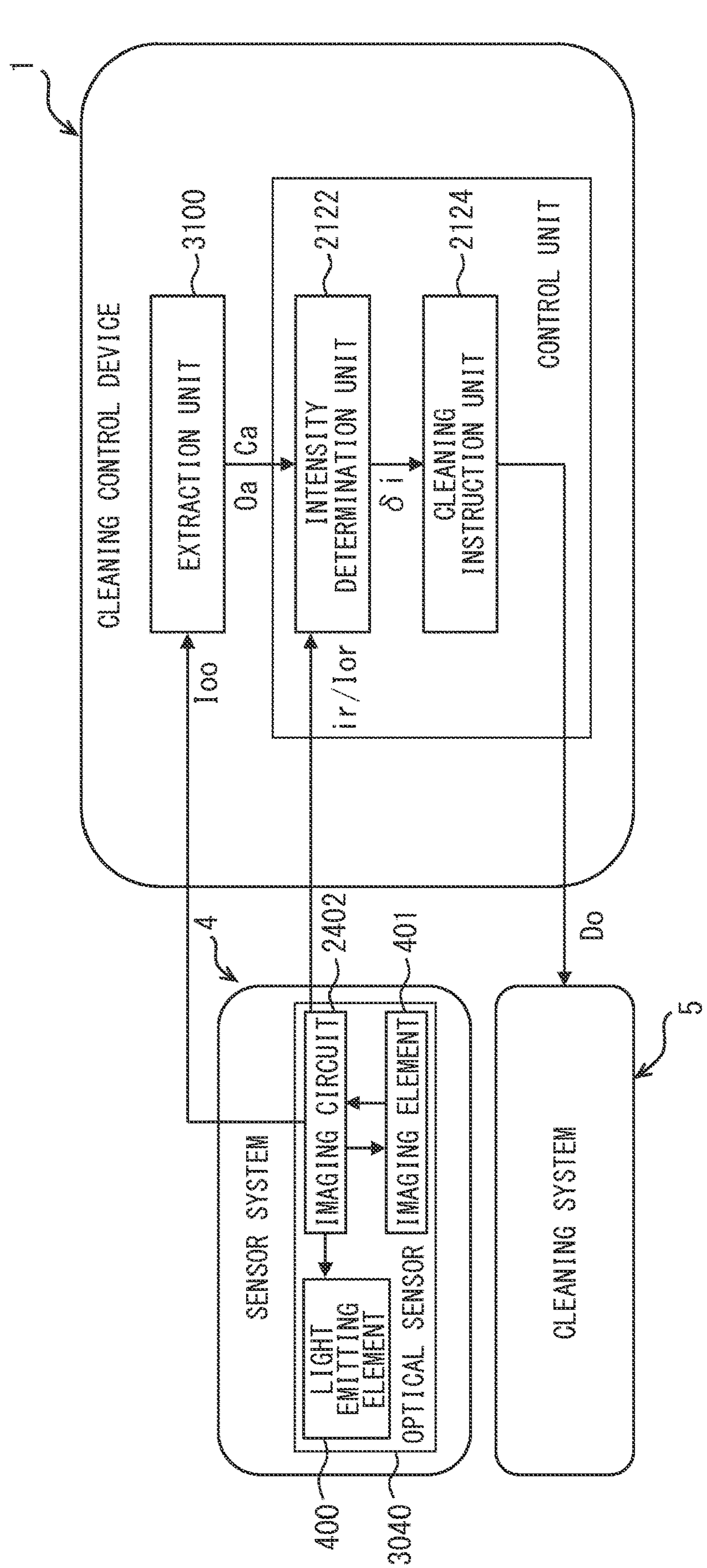
FIG. 14 is a block diagram showing a detail configuration of the cleaning control device according to a third embodiment.

A third embodiment shown in FIG. 14 is a modification of the second embodiment.

In the third embodiment, the optical sensor 3040 is configured to acquire the outside light image Ioo while the light irradiation stops as in the first embodiment and acquire the reflected light intensity ir while the light is irradiated as in the second embodiment. The imaging element 401 is configured to sense both the reflected light for acquiring the reflected light intensity ir and the outside light for acquiring the outside light image Ioo. The sensing camera 41 in the third embodiment is not essential, and the sensing camera 41 is omitted in FIG. 14.

Figure 15:
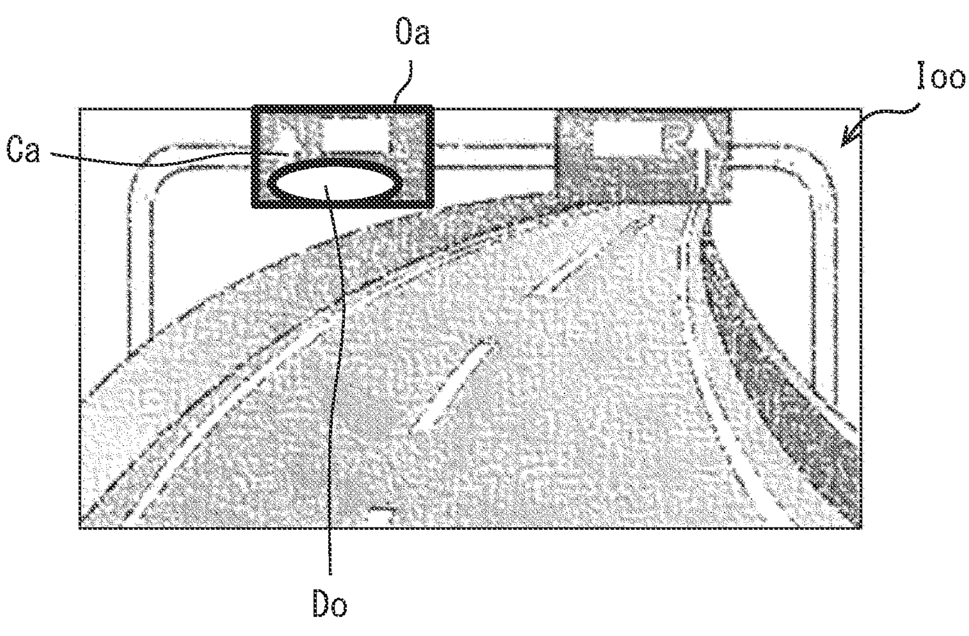
FIG. 15 is a diagram illustrating an image acquired by the optical sensor according to the third embodiment.

The extraction unit 3100 of the third embodiment receives the outside light image Ioo from the optical sensor 3040 for each control cycle. As shown in FIG. 15, the extraction unit 3100 extracts at least one target object Oa which is an object of interest in the outside light image Ioo. The target object Oa is extracted by the extraction unit 3100 as in the second embodiment.

Figure 16:
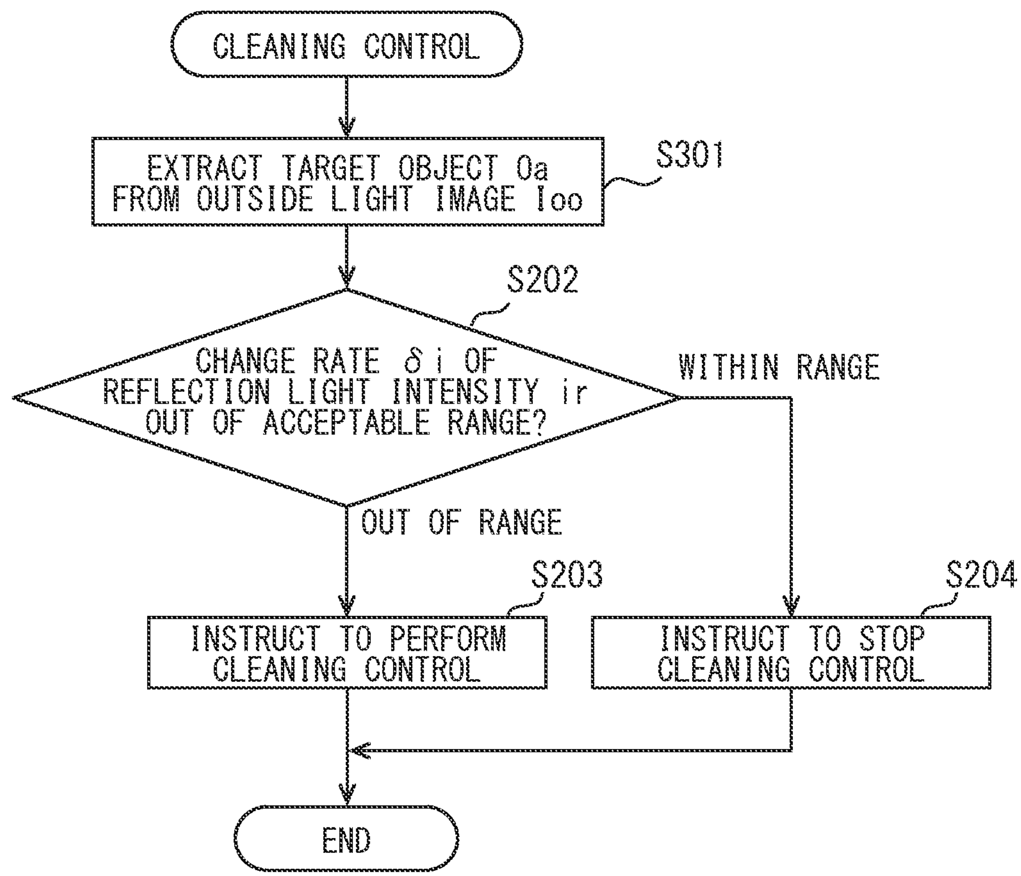
FIG. 16 is a flow chart showing a cleaning control method according to the third embodiment.

In a flow of the cleaning control method according to the third embodiment, the extraction unit 3100 extracts in S301 the target object Oa from the outside light image Ioo as shown in FIG. 16. S202, S203, and S204 subsequent to S301 are executed as in the second embodiment. Accordingly, S301 corresponds to an extraction process, and S202, S203, S204 correspond to a control process.

Operation Effect

Hereinbelow, effects of the above third embodiment will be described.

According to the third embodiment, the target object Oa is extracted from the outside light image Ioo acquired by the optical sensor 3040 based on the outside light intensity while the light irradiation stops for acquiring the reflected light intensity ir. The change amount δi of the reflected light intensity ir from the target object Oa acquired by irradiation of light from the optical sensor 3040 is adequately estimated to correspond to the dirt Do (see FIG. 15) adhering to the incident surface 33*o* of the optical sensor 2040 when the change amount δi is out of the acceptable range. Accordingly, by instructing the control to the cleaning system 5 to remove the dirt Do as a result of the estimation, the cleaning control can be more accurate.

In the reflected light image Ior acquired by the optical sensor 3040 as in the third embodiment, it is easy to accurately specify the pixel corresponding to the target object Oa extracted from the outside light image Ioo acquired by the optical sensor 3040. According to this, the cleaning for the dirt Do which is estimated to correspond to the change amount δi out of the acceptable range can be adequately instructed when the change amount δi of the reflected light intensity ir at the pixel corresponding to the target object Oa in the reflected light image Ior is out of the acceptable range.

According to the third embodiment, the change amount δi of the reflected light intensity ir from the target object Oa which is sensed by the element 401 of the optical sensor 3040 which senses the outside light intensity is suppressed from being out of the acceptable range due to axis deviation of these intensity sensing. Accordingly, the cleaning for the dirt estimated to correspond to the change amount δi out of the acceptable range can be adequately instructed.

OTHER EMBODIMENTS

Although a plurality of embodiments have been described above, the present disclosure is not to be construed as being limited to these embodiments, and can be applied to various embodiments and combinations within a scope not deviating from the gist of the present disclosure.

The dedicated computer of the cleaning control device 1 in a modification example may be at least one outside center computer communicating with the vehicle 2. The dedicated computer of the cleaning control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

A translucent cover 32 that forms the incident surface 33*o* in the modification example may be provided in the optical sensor 40, 2040, 3040. The incident surface 33*o* of the modification example may be an optical member such as a lens of the optical sensor 40, 2040, 3040. The translucent cover 32 that forms the incident surface 33*c* in the modification example may be provided in the sensing camera 41. The incident surface 33*c* of the modification example may be an optical member such as a lens of the sensing camera 41.

What is claimed is:

1. A cleaning control device configured to control a cleaning system of a vehicle equipped with (i) an optical sensor configured to acquire an outside light image according to intensity of outside light while light irradiation for sensing reflected light is stopped, (ii) a sensing camera configured to acquire a camera image according to the intensity of the outside light, and (iii) the cleaning system configured to clean an incident surface on which light is incident from sensing areas of the optical sensor and the sensing camera overlapping with each other, the cleaning control device comprising:

- an extraction unit configured to extract an unmatched pixel group by comparing the outside light image with the camera image; and
- a control unit configured to instruct the cleaning system to perform cleaning control to remove dirt from the incident surface, the dirt being estimated to correspond to the unmatched pixel group, wherein

- the optical sensor includes a light emitting element and an imaging element, and the optical sensor is configured to acquire optical information usable in an automated driving mode of the vehicle, and during a period in which light irradiation from the light emitting element is stopped, the optical sensor acquires, using the imaging element, an outside light image corresponding to intensity of outside light from outside the vehicle, the outside light image not including the reflected light from the light emitting element, wherein the extraction unit is configured to perform edge detection on both the outside light image and the camera image, and to compare, in a comparison of, the detected edges in the outside light image with the detected edges in the camera image, and to extract as the unmatched pixel group an unmatched edge pixel group identified based on the comparison.

2. The cleaning control device according to claim 1, wherein the extraction unit is configured to compare the outside light image with the camera image after interpolating a higher-resolution one of the outside light image and the camera image to a lower-resolution one of the outside light image and the camera image.

3. The cleaning control device according to claim 1, wherein the control unit is configured to instruct the cleaning system of the vehicle in an automated driving mode to perform the cleaning control.

* * * * *